US011740210B2

(12) United States Patent
Stafstrom et al.

(10) Patent No.: US 11,740,210 B2
(45) Date of Patent: Aug. 29, 2023

(54) CHROMATOGRAPHY APPARATUS

(71) Applicant: GE Healthcare Bio-Sciences AB, Uppsala (SE)

(72) Inventors: Nils Stafstrom, Uppsala (SE); Lars Olof Nils Rosengren, Uppsala (SE); Kerstin Elisabet Erickson, Uppsala (SE); Tomas Yngve Agren, Uppsala (SE); Yngve L. Hareland, Uppsala (SE); Tim Francois, Uppsala (SE); Anita Jonsson, Uppsala (SE); Jeanne Cheng, Uppsala (SE); Anna Andersson, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 569 days.

(21) Appl. No.: 16/647,983

(22) PCT Filed: Sep. 21, 2018

(86) PCT No.: PCT/EP2018/075693
§ 371 (c)(1),
(2) Date: Mar. 17, 2020

(87) PCT Pub. No.: WO2019/057936
PCT Pub. Date: Mar. 28, 2019

(65) Prior Publication Data
US 2020/0264140 A1 Aug. 20, 2020

(30) Foreign Application Priority Data
Sep. 22, 2017 (GB) ...................................... 1715403

(51) Int. Cl.
*G01N 30/44* (2006.01)
*G01N 30/32* (2006.01)
(Continued)

(52) U.S. Cl.
CPC ............. *G01N 30/44* (2013.01); *G01N 30/32* (2013.01); *G01N 30/46* (2013.01);
(Continued)

(58) Field of Classification Search
CPC ........ G01N 30/44; G01N 30/32; G01N 30/46; G01N 30/6052; G01N 30/8696; G01N 2030/326
See application file for complete search history.

(56) References Cited

U.S. PATENT DOCUMENTS 8,821,718 B2 * 9/2014 Blomberg .......... G01N 35/1097
137/343
2008/0035542 A1 2/2008 Mourtada et al.
(Continued)

FOREIGN PATENT DOCUMENTS

CN 101622044 1/2010
CN 102918309 2/2013
(Continued)

OTHER PUBLICATIONS

PCT International Search Report and Written Opinion for PCT Application No. PCT/EP2018/075693 dated Apr. 3, 2019 (16 pages).
(Continued)

Primary Examiner — Benjamin L Lebron
(74) Attorney, Agent, or Firm — Eversheds Sutherland (US) LLP

(57) ABSTRACT

Disclosed is a chromatography system (100) comprising: plural modules (1-25) including at least one pump and a column valve unit (8) connectable to plural chromatography columns; and a controller (600), the controller being operable to control the or each pump and the column valve to perform different chromatographic processes, including chromatography employing just one column, as well as chromatography employing two or more columns by selec-
(Continued)

tive valve opening in said unit. The system includes a housing (110) into which the plural modules (1-25) are interchangeably mountable in apertures of one generally vertical face of housing, the modules are adapted for selective fluidic interconnection by tubing substantially at said one face such that in use the modules and tubing occupy a generally vertically extending volume to minimize the footprint of the system.

5 Claims, 5 Drawing Sheets

(51) Int. Cl.
*G01N 30/46* (2006.01)
*G01N 30/60* (2006.01)
*G01N 30/86* (2006.01)

(52) U.S. Cl.
CPC ..... *G01N 30/6052* (2013.01); *G01N 30/8696* (2013.01); *G01N 2030/326* (2013.01)

(56) References Cited

U.S. PATENT DOCUMENTS

| | | | |
|---|---|---|---|
| 2012/0125440 A1 | 5/2012 | Price | |
| 2013/0218352 A1* | 8/2013 | Iovanni | G01N 30/468 700/282 |
| 2016/0109473 A1 | 4/2016 | DeMarco | |
| 2017/0107476 A1 | 4/2017 | Polley et al. | |

FOREIGN PATENT DOCUMENTS

| | | | | |
|---|---|---|---|---|
| CN | 105203689 | A | 12/2015 | |
| CN | 105980847 | | 9/2016 | |
| CN | 106461619 | | 2/2017 | |
| EP | 1886133 | B1 * | 3/2013 | ............ B01D 15/20 |
| JP | 07229885 | A | 8/1995 | |
| JP | 200097924 | A | 4/2000 | |
| JP | 2001255316 | A | 9/2001 | |
| JP | 2012529650 | A | 11/2012 | |
| JP | 2013137331 | A | 7/2013 | |
| WO | 2007/045491 | A2 | 4/2007 | |
| WO | 2008109192 | A | 9/2008 | |
| WO | 2008/156484 | A1 | 12/2008 | |
| WO | 2008156484 | A1 | 12/2008 | |
| WO | 2010/144037 | A1 | 12/2010 | |
| WO | 2013/028828 | A1 | 2/2013 | |
| WO | 2015/011522 | A1 | 1/2015 | |
| WO | 2015/121425 | A1 | 8/2015 | |
| WO | 2016/096790 | A1 | 6/2016 | |

OTHER PUBLICATIONS

GB Search Report for GB Application No. 1715403.0 dated Feb. 28, 2018 (4 pages).
GB Search Report for GB Application No. 1715403.0 as to Claim 7 dated Apr. 27, 2018 (2 pages).
GB Search Report for GB Application No. 1715403.0 as to Claims 8-11 dated Apr. 27, 2018 (2 pages).
GB Search Report for GB Application No. 1715403.0 as to Claims 12-14 dated Apr. 27, 2018 (2 pages).
Office Action Issued in Chinese Patent Application No. 201880061359.6, dated Sep. 28, 2022 with English Translation (12 pages).
Office Action Issued in JP 2020-516802, dated Sep. 5, 2022 with English Summary. (23 pages).
Office Action Issued in Chinese Patent Application No. 201880061359.6, dated Feb. 23, 2023 with English Translation (18 pages).

* cited by examiner

CHROMATOGRAPHY APPARATUS

CROSS REFERENCE TO RELATED APPLICATIONS

This application claims the priority benefit of PCT/EP2018/075693 filed on Sep. 21, 2018, which claims priority to Great Britain Patent Application. No 17154010 filed Sep. 22, 2017, the entire contents of which are hereby incorporated by reference herein.

TECHNICAL FIELD

The present invention relates to liquid chromatography apparatus, in particular but not exclusively to a laboratory or 'benchtop' size instrument of a versatile nature allowing convenient reconfiguration for different chromatographic procedures and convenient automated use. The invention extends to methods for operating such instruments.

BACKGROUND

Liquid chromatography is a well-known procedure for separating mixtures of molecules, for example separating proteins in liquid samples. The proteins may typically be suspended in a fluid, and driven through a chromatography separation medium along with a buffer solution. The various sample molecules of the mixture travel at different speeds through a chromatography medium, causing them to separate. This separation may be completed by a fractionation step where the mobile phase may be directed to different containers, e.g. by an outlet valve of the chromatography apparatus.

In some applications, e.g. in the biopharmaceutical field, recent advancements in genetic engineering and cell culture technology have driven expression levels higher than ever, putting a considerable burden on down-stream purification, especially the fractionation step. While the introduction of new chromatography media compositions significantly improves the efficiency of a process based on a conventional fixed bed chromatography, additional gains can be achieved by operating in a continuous manner. The latter is especially appealing when continuous bioreactors, such as those operated in perfusion mode, are employed.

In continuous chromatography, two or more identical columns are connected in an arrangement that allows columns to be operated in series and/or in parallel, depending on the method requirements. Thus, all columns can be run in principle simultaneously, but in different stages. The procedure may be repeated, such that each column is loaded/packed, eluted, and regenerated several times in the process. Compared to 'conventional' chromatography, wherein a single chromatography cycle is based on several consecutive steps, such as loading, wash, elution and regeneration, in continuous chromatography based on multiple identical columns all these steps occur simultaneously but on different columns. Continuous chromatography operation results in a better utilization of chromatography media compositions, reduced processing time and reduced buffer fluid requirements, all of which benefits process economy. Continuous chromatography is sometimes denoted simulated moving bed (SMB) chromatography.

As previously mentioned each column may be loaded/packed, eluted, cleaned, and regenerated several times in the process. An essential factor for a reliable continuous chromatography process is the quality of the columns used, and more specifically the similarity or even density of media in each column. If the columns are not identical, the theoretical calculations will not be correct, and it will become difficult to design an efficient and robust continuous chromatography process. However, the loading/packing of a column with chromatography media composition, is very complex in order to obtain repeatable results. Even small differences in the number of plates or other packing properties can have a huge effect on the end result.

A problem with conventional solutions is that performing continuous chromatography is a cumbersome, complex and time consuming operation. Often the process must be interrupted to perform reconnection of fluid couplings/tubes, to perform packing of columns or to load a pre-packed column, to perform cleaning operations etc.

Thus, there is a need for an improved chromatography apparatus for performing continuous chromatography.

Furthermore, even though chromatography apparatus which performs continuous chromatography of the type mentioned above are known, for example those sold under the tradename of ÄKTApilot by GE Healthcare, and these known instruments function well, providing a versatile instrument which can be re-plumbed for different functionality if needed, these instruments lack some functionality, such that there are only certain procedures in which they can be employed, and an extension of that versatility would be commercially attractive, but is not easy to achieve with the competing restraints of instrument size, maintaining versatility, practical aspects such as ease of cleaning internally and externally, and cost.

SUMMARY OF THE INVENTION

Embodiments of the present invention address the problems mentioned above. Thereby, an object of the present invention is to provide a chromatography instrument with one or more of: an increased functionality, for example able to operate in conventional batch chromatography as well as continuous chromatography; is useable across a wider range of applications; does not have a substantially increased overall size or manufacturing cost; and is simple to operate.

Good Manufacturing Practice (GMP) sets out guidelines for bioprocessing procedures, which if followed require cleanliness standards. Advantageously, the standards are easier to achieve with the proposed apparatus, for example where fluid paths in the instrument have, in one configuration at least, a continuous flow path with no substantive stagnant portions, thereby providing complete cleaning without the need to break down the fluid conduits. Embodiments of the proposed instrument provide a sanitary small-scale chromatography instrument suitable for both GMP and non-GMP work. Functionally wide flow and pressure ranges of the instrument makes it fit for both production of technical batches and scale-up studies as well as small-scale production of GMP-grade material. The high accuracy and flow range of the pumps enables precise gradient formation, covering a large range of chromatography column sizes and more repeatable results.

In embodiments, a modular construction provides increased functionality, for different uses. Interactive control software allows changes to be made in real-time and unexpected deviations to be quickly identified. The small, benchtop size frees up lab space. The instrument allows in-situ column packaging, i.e. the ability to compress chromatography media in the column, or each column where two or more columns are used, whilst being connected to the instrument, and without having to then disconnect any fluid conduits prior to performing chromatographic procedures.

According to an aspect of the invention, there is provided a chromatography instrument as claimed herein having features set out the in independent apparatus claims, are further preferred features set out in the dependent apparatus claims.

According to another aspect of the invention, there is provided a method for operating a chromatography instrument as claimed herein having features set out the in independent method claims, are further preferred features set out in the dependent method claims.

The invention extends to any features described herein. Where embodiments show and/or describe features in combination herein, a claim which includes just one or a subset of said combined features is expressly considered to fall within the ambit of the invention disclosed herein.

More advantages and benefits of the present invention will become readily apparent to the person skilled in the art in view of the detailed description below.

DRAWINGS

The invention will now be described in more detail with reference to the appended drawings, wherein.

DETAILED DESCRIPTION

Figure 1:
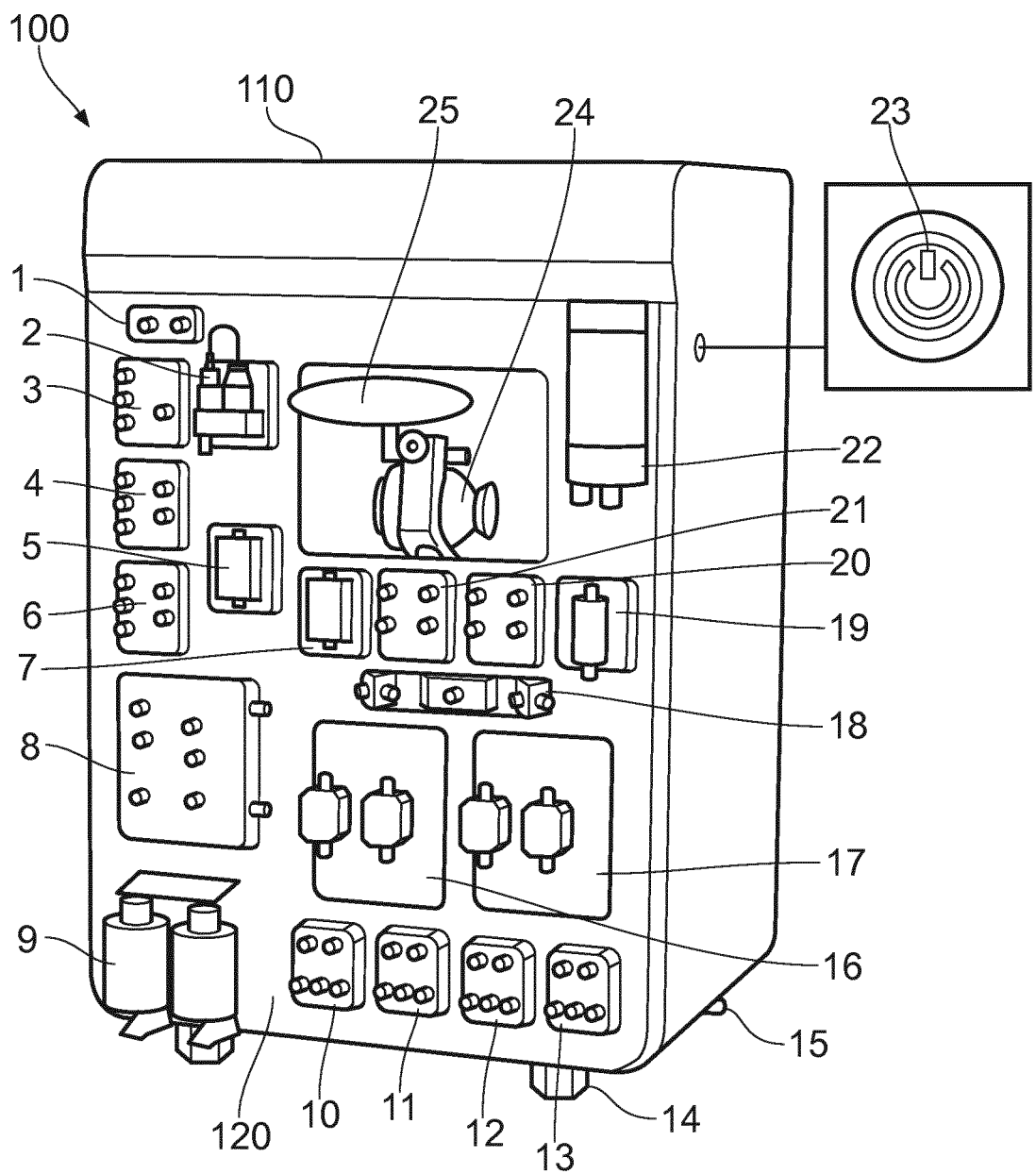
FIG. 1 shows a pictorial view of a new chromatography apparatus.

FIG. 1 sows a chromatography apparatus 100 according to an aspect of the invention. The apparatus includes, but it not limited to, individual modules 1 to 25 as listed below, at least some of which are demountable from an apertured front panel 120 of a housing 110 of the apparatus 100 and mounted thereon in one generally vertical plane, such that the liquid connections required between modules can be made only at the front face 120. In practice the demountable modules have no more than two standard sizes which can, if needed, be repositioned on the panel 120 to suit a different procedure. Each module has a serial bus communication connection and power connection so that its physical position is immaterial to a controller for example located in the housing 110, or located remotely. Thereby, the modules can be regarded as modular and thereby repositionable and/or interchangeable.

The chromatography apparatus shown in FIG. 1 has the following module modules:

1 Control panel
2 pH monitor
3 Outlet valve 1-3, port 1 can be used for waste
4 Outlet valve 4-6
5 Conductivity monitor
6 Outlet valve 7-9
7 Pre-column Conductivity monitor
8 Column valve, including pre- and post-column pressure sensor
9 Bottles for pump rinsing solution
10 Inlet valve A1-A3
11 Inlet valve A4-A6
12 Inlet valve B1-B3
13 Inlet valve B4-B6
14 Fixed rubber feet
15 Adjustable feet
16 System pump A
17 System pump B
18 Flow restrictor, including system pressure monitor
19 Mixer module
20 Mixer valve
21 Air trap valve, including air sensor
22 Air trap
23 ON/OFF button
24 Holder for in-line filter (typical filter capsule shown)
25 UV monitor Modules can be omitted or repositioned as explained above. It will be apparent that some modules can be replaced with other modules or the space left by an omitted module can be filled with a blanking plate (see e.g. 26 FIG. 4). More than one of the same numbered modules can be used where necessary.

Fluid interconnections between the fluid manipulating modules of the apparatus i.e. all the modules listed above except modules 1, 15 and 23, and external modules for example sample input reservoirs, buffer fluid reservoirs, chromatograph column(s) and fraction collection equipment, all not shown in FIG. 1, are made via fluid conduits in this case in the form of flexible plastics tubing, which can be readily coupled and uncoupled to corresponding ports of the fluid manipulating modules, in any desired configuration, for example using a coupling as disclosed in a related application GB1710279 filed 28 Jun. 2017 incorporated herein by reference.

Figure 2:
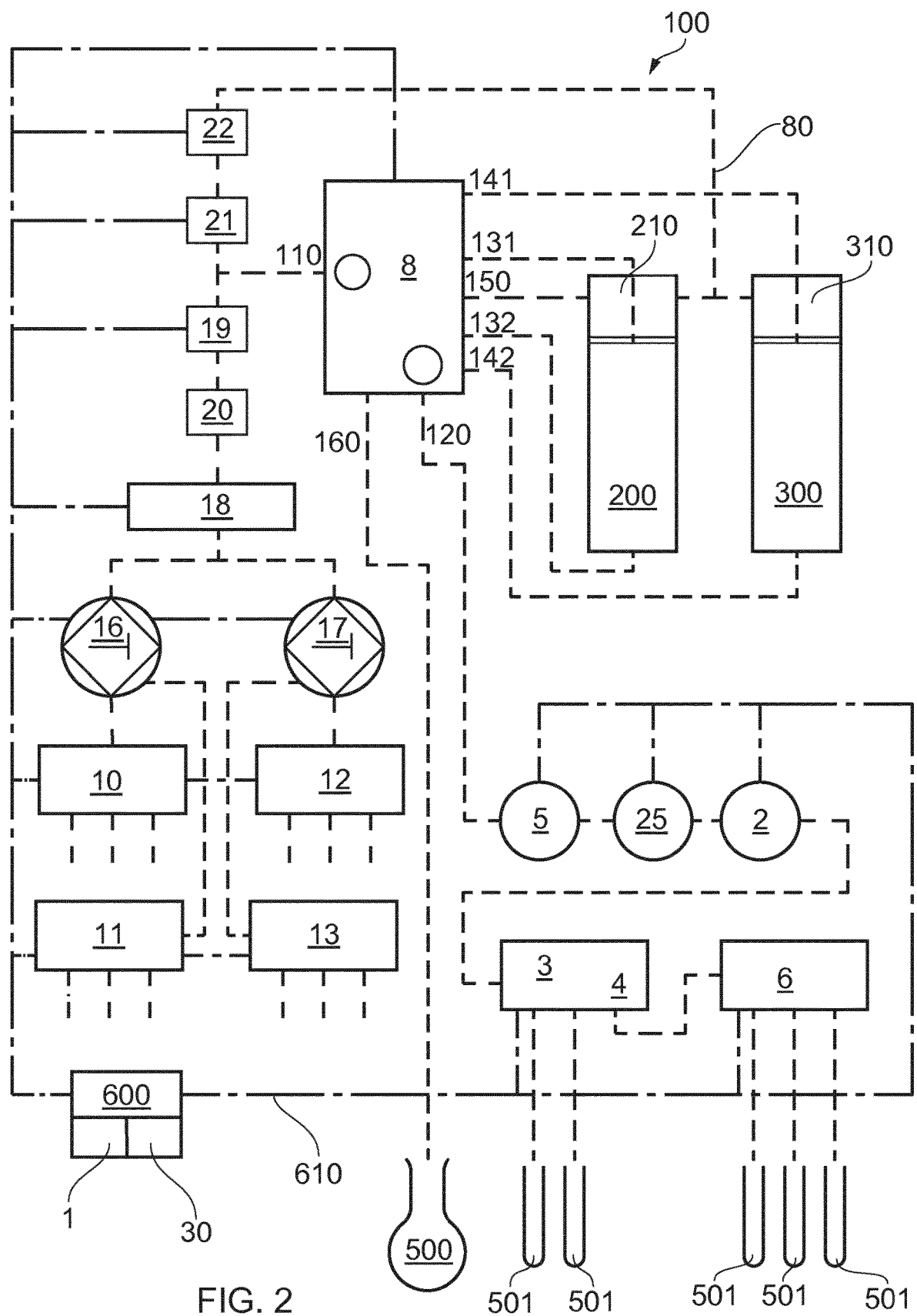
FIG. 2 shows shematic representation of the apparatus shown in FIG. 1.

FIG. 2 shows one possible liquid interconnection configuration between the main modular modules of the chromatography apparatus, connected in this case to two chromatography columns 200 and 300, although the apparatus allows any workable interconnection between modules and additional parts such as multiple columns, and liquid reservoirs. Reconfigurable liquid interconnections are denoted by short chain dotted lines 80.

At the heart of the apparatus 100 is the column valve 8, which in this case has a construction as disclosed in our co-pending patent application filed on the same day as this application, and having the title 'VALVE UNIT FOR A CHROMATOGRAPHY APPARATUS' and is incorporated herein by reference. The value unit 8 provides multiple switching of flow for allowing flow in one or both columns 200/300 in either direction (up or down in the drawing). The user can select upflow or downflow, or select to bypass one or both columns. The flow can be directed to waste or to the next component in the flow path. The columns can also be connected in series. The Column valve includes pre-column and post-column pressure sensors. In addition the valve has a port 150 which can be used to change the volume of hydraulic cylinders 210 are 310 which are part of the columns 200 and 300, for example to provide compression of the columns' contents, also known as column packing. That packing procedure can be automated. With such a system column diameters of between about 25 and 250 mm have been found to be packable in this way. The columns can be pre-packed, but rinsed and re-consolidated with the aid of pressure sensors in the value unit 8 measuring back-pressure resulting from pressure within the columns and in accordance with to known protocols, for example as described in WO2007045491, which disclosure is incorporated herein by reference.

The remaining system 100 comprises:

Inlet valve groups A and B, 10,11,12 and 13, suitable for providing selectable liquids including sample containing liquids buffer solutions, and cleansing fluids;

The inlet valves supply two system pumps, here each having a pair of pistons and associated one-way valves, providing a variable flow rate of between 0-600 ml per minute each (1200 ml/min max), with a high volume and resolution of flow, enabling accurate flow rates to be maintained. Such accuracy enables good repeatability of results for a wide range of column diameters;

The pumps supply, in series a flow restrictor 18, which includes a system pressure monitor, a mixer valve 20, and a mixer module 19, before pumped liquid is diverted to the column valve unit 8;

Any entrained air can escape via an air trap valve 21, and an air trap vent 22, which vent also has an air escape from the columns 200 and 300. The air trap may be constructed in accordance with pending application GB1713993 filed 5 Apr. 2017, which disclosure is incorporated herein by reference;

Once liquids reach the column valve unit they can be routed in accordance with the arrangement described in said co-pending application with the title 'VALVE UNIT FOR A CHROMATOGRAPHY APPARATUS', and thereby numerous modes of chromatography can be performed, from simple batch work, where a straightforward chromatographic separation process is performed using just one column, to procedures which more closely copy larger scale commercial procedures where two or more columns can be employed, one being readied for use while the other is being used for separation. The valve port numbering used is the same as that used in said co-pending application and here has the same arrangement;

Output from the chromatography column(s) is passed out through port 120 to: a conductivity monitor 5, a UV light absorption monitor 25, and a pH monitor 2, and is thence directed into an appropriate storage vessel in dependence on the signals from the three monitors, and thereby, separated fractions are collected in an appropriate vessel 501. Column washings can be collected in a waste vessel 500;

The long chain dotted lines in FIG. 2 represent a system bus 500 which carries signals and power to and from the modules mentioned above, to and from a controller 600. It will be appreciated that controlling and monitoring signals may be transmitted wirelessly according to known protocols, doing away with the need for a communication bus. The chromatography system 100 includes also a display screen 30. Software running on the controller will display plural icons on the screen 30 and allow user manipulation of the icon on the screen to drag and drop the icons to form a series of icons representative of a user defined chromatography control method, for ease of use.

Figure 3:
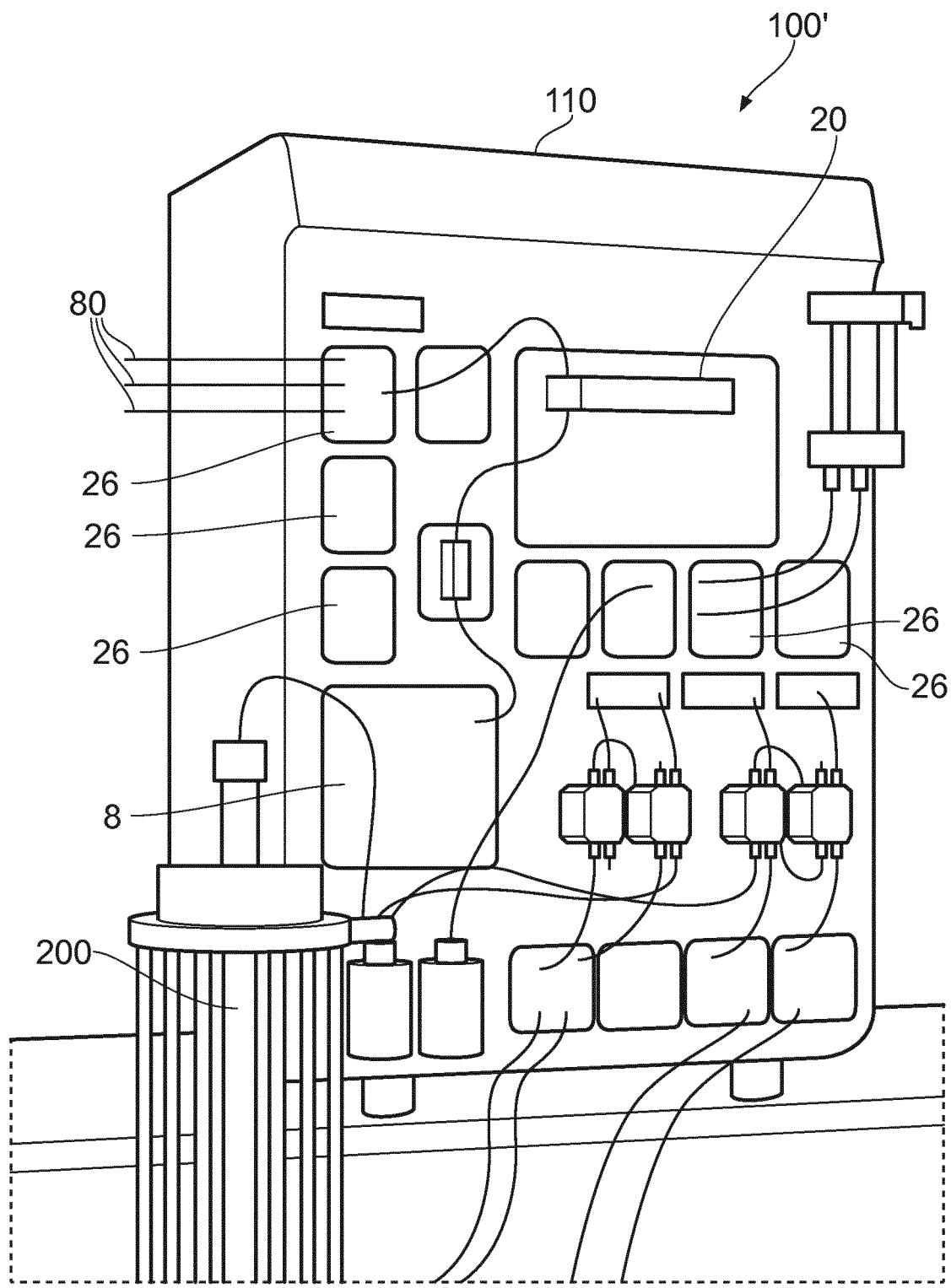
FIGS. 3, 4 and 5 show configurations of the apparatus shown in the previous Figures.
Figure 4:
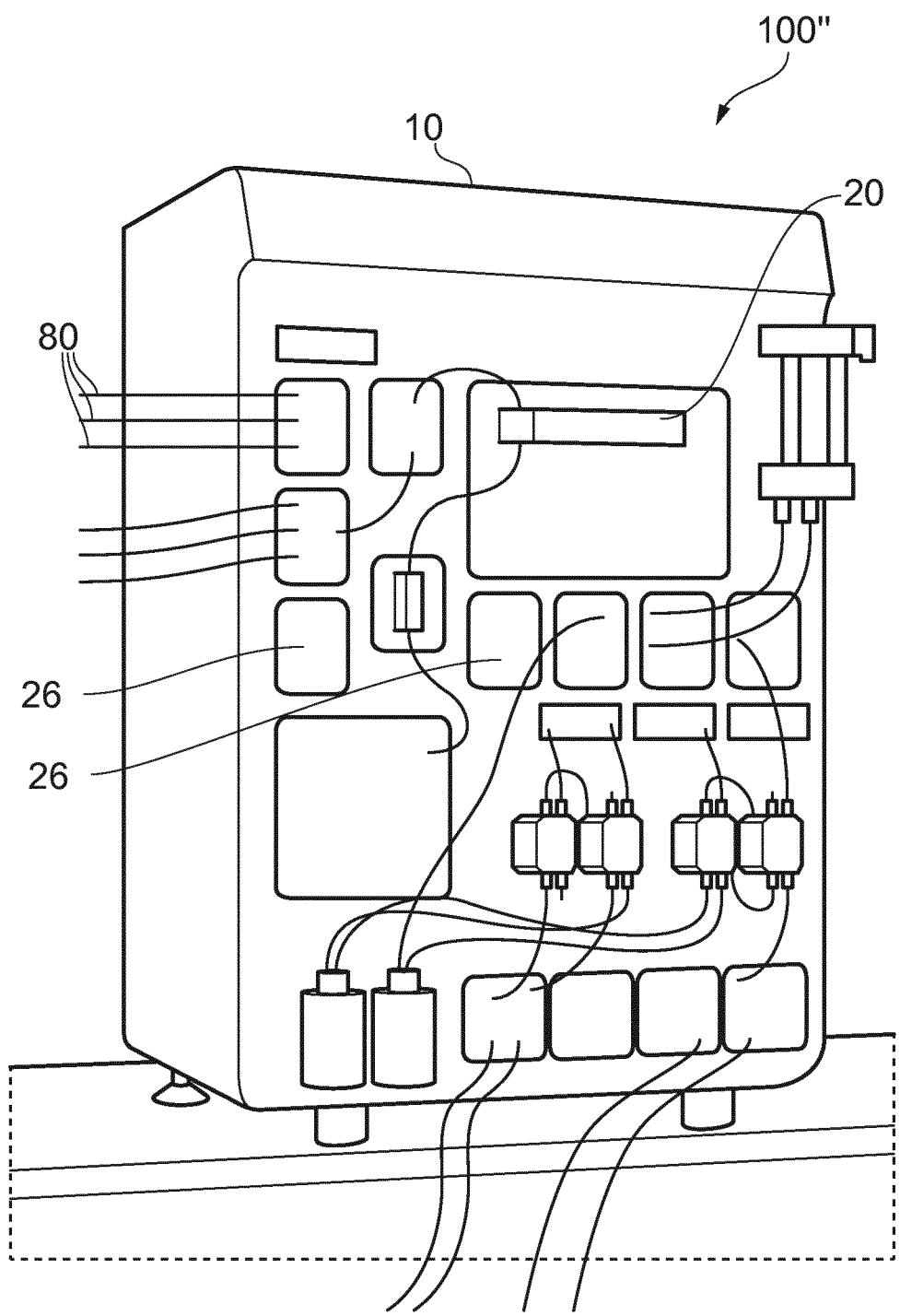
Figure 5:
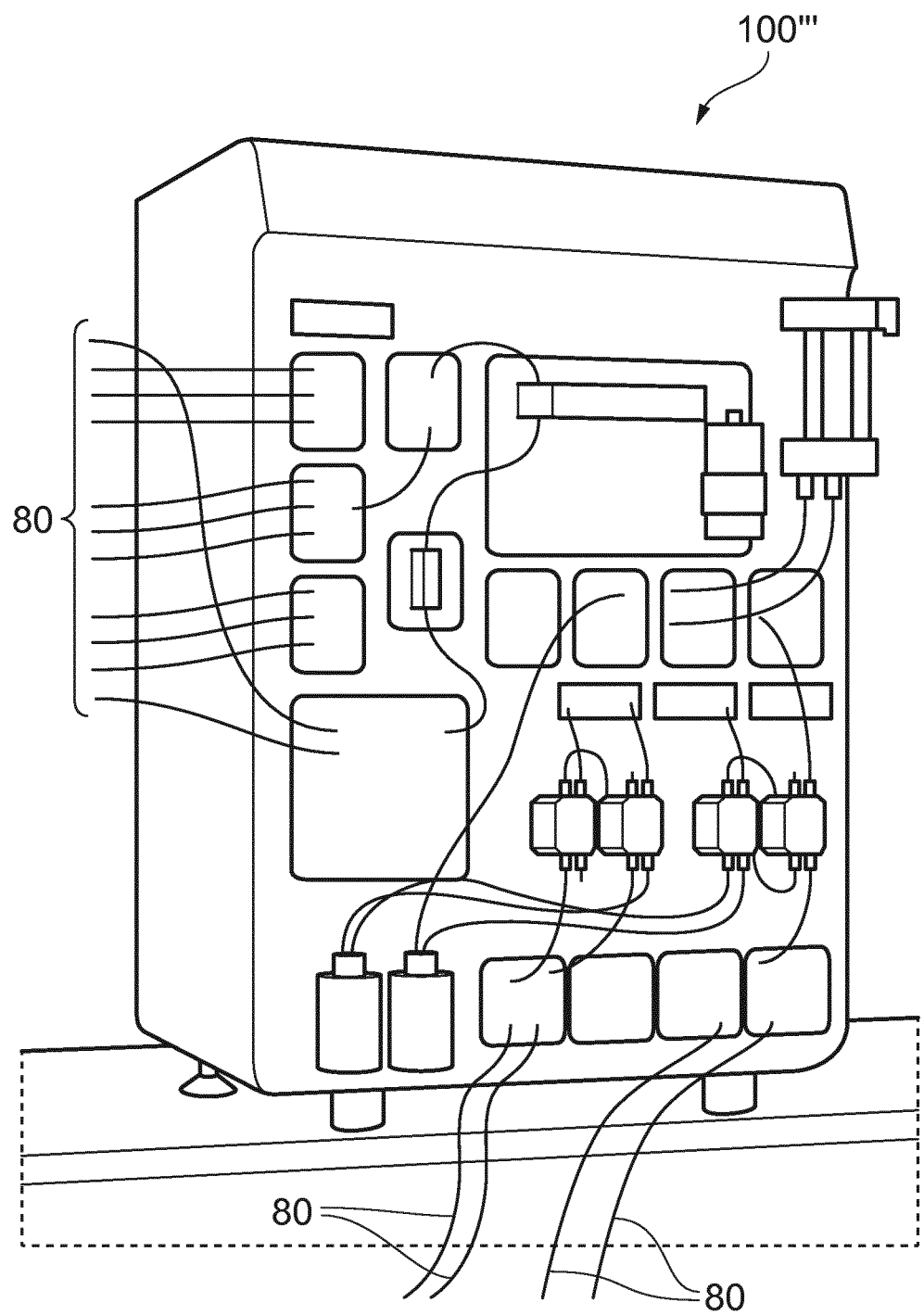

FIGS. 3, 4 and 5 show the system connected with tubing for various configurations, where only some of the modules referenced in FIG. 1 remain in place in these figures, and the apertures left by removed modules are blanked off with blanking plates 26, screwed into place over the aperture to prevent accidental liquid ingress into the housing 110.

In FIG. 3 a system 100' with a configuration of modules suitable for regulated environments where systems are custom-built in a factory. The system is delivered mounted, calibrated, and performance tested and suitable for work in GMP environments. FIG. 4 shows one system with some modules removed, and FIG. 5 shows a system 100''' with more modules in place, similar to FIG. 1, and showing typical tubular interconnections 80.

In use, modules are easily removed or added to the system and installation finalized through a one-click activation in software which can recognize each module. The software can provide comprehensive and customizable operational control as well as pre-emptive maintenance. In addition to the modules described above, input-output communication modules can be used to interface with analog and/or digital external sensors or other equipment such as automatic fraction collecting devices. The wide flow rate and pressure ranges enables more than 40-fold scaling in the range 25 to 250 mm internal diameter columns. This wide range makes the apparatus suitable to bridge the transition into GMP environments.

The packing (and re-packing) of chromatography columns, using the system described above is controllable fully by the controller 600 initiated by the control panel 1. The controller 600 is able to drive the a display screen 30 (FIG. 2) to aid visualisation of the packing process and progress. The control software includes an accessible column packing record. Columns packing records can therefore be defined, created, and updated from the software for traceability and quality assurance purposes. In addition, the record can be used to monitor column performance and provide statistics for usage, separation performance, and packing intervals.

The display screen can provide a process visualization which quickly gives an operator an overview of the system's function, progress through operational steps and alarms, only providing the desired amount of information at each step. The active flow path is always displayed in the process visualisation to minimize user errors. Real time changes can be made by selecting the appropriate process on the visualization screen, e.g. selecting or dragging icons on the screen. Control, graphical interfaces are provided for specific sections, such as the column valve 8.

Preprogrammed steps are employed but these can be modified and saved as user-defined steps for added customization.

The system described and illustrated above is designed for sanitary environments. For example, the system chassis 110 is flat or curved without joints, gaps or significant concavities, other than at the edges of the faces, which makes it easy to wipe down and reduces the chance of dust and liquid trapping. The pH monitor 2 has in-line calibration and the column valve 8 provides in-process column packing, so a closed flow path through operations can be employed, meaning that no breaks in the fluid path need be made throughout one or more chromatography column packing/regeneration stages and throughout the separation operation.

The invention is not to be seen as limited by the embodiments described above, but can be varied within the scope of the appended claims as is readily apparent to the person skilled in the art.

The invention claimed is:

1. A chromatography system comprising: plural modules including at least one pump and a column valve unit connectable to plural chromatography columns; and a controller, the controller being operable to control the at least one pump and the column valve unit to perform different chromatographic processes, including chromatography employing just one column, as well as chromatography employing two or more columns by selective valve opening in said column valve unit, wherein the controller is further operable to perform column packing, column packing testing, or a combination thereof.

2. The chromatography system as claimed in claim 1, wherein said selective valve opening allows a reversal of flow directions in use in one or more of said plural chromatography columns.

3. The chromatography system as claimed in claim 1, further comprising a controller operable to control said modules according to software, and a display screen, said software being suitable to display plural icons on said screen and allowing user manipulation of the icon on the screen to drag and drop the icons to form a series of icons representative of a user defined chromatography control method.

4. The chromatography system as claimed in claim 3, wherein the user defined method includes a continuous chromatography process employing said two or more chromatography columns.

5. The chromatography system as claimed in claim 1, further comprising plural chromatography columns, each column including a chamber of changeable volume for housing chromatographic separation media and an adapter moveable to increase or decrease each said volume, and wherein the column valve unit is in fluid communication with each said adapter and is selectively operable to move independently or collectively each said adapter by means of fluid pressure changes to consequently change each said volume and in use to cause compression or relief from compression of media within each said column volume.

* * * * *